US011204306B2

(12) United States Patent
Saetveit

(10) Patent No.: US 11,204,306 B2
(45) Date of Patent: Dec. 21, 2021

(54) PRECONCENTRATION OF FLUID SAMPLES WITH ALTERNATING DUAL LOOP INTRODUCTION

(71) Applicant: Elemental Scientific, Inc., Omaha, NE (US)

(72) Inventor: Nathan Saetveit, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 79 days.

(21) Appl. No.: 16/536,893

(22) Filed: Aug. 9, 2019

(65) Prior Publication Data

US 2020/0049602 A1 Feb. 13, 2020

Related U.S. Application Data

(60) Provisional application No. 62/717,340, filed on Aug. 10, 2018.

(51) Int. Cl.
*G01N 1/40* (2006.01)
*G01N 1/22* (2006.01)
(Continued)

(52) U.S. Cl.
CPC .............. *G01N 1/405* (2013.01); *G01N 1/14* (2013.01); *G01N 1/2035* (2013.01);
(Continued)

(58) Field of Classification Search
CPC .................. G01N 1/2205; G01N 1/24; G01N 2001/2223; G01N 1/14; G01N 1/2035
(Continued)

(56) References Cited

U.S. PATENT DOCUMENTS 3,508,582 A * 4/1970 Aulisa ..................... F16L 39/04
137/625.11
3,868,970 A * 3/1975 Ayers ..................... F16K 11/074
137/625.46
(Continued)

FOREIGN PATENT DOCUMENTS

JP 2008309596 A 12/2008
KR 19980039942 A 8/1998
(Continued)

OTHER PUBLICATIONS

International Search Report and Written Opinion for PCT/US2019/045938, dated Nov. 29, 2019.

*Primary Examiner* — Clayton E. LaBalle
*Assistant Examiner* — Kevin C Butler
(74) *Attorney, Agent, or Firm* — Kevin E. West; Advent, LLP

(57) ABSTRACT

Systems and methods for automatic preconcentration of fluid samples using alternating dual holding loops are described. A system embodiment includes, but is not limited to, a first sample loop and a second sample loop alternately fluidically coupled with a sample source; a first valve to alternately introduce fluid from the sample source to the first sample loop and the second sample loop; a second valve to alternately receive fluid from the first sample loop and the second sample loop and to alternately provide access to the preconcentration column to fluid received from the first sample loop and the second sample loop; and a pump system configured to alternately introduce sample held in the first sample loop and sample held in the second sample loop to the preconcentration column via the first valve and the second valve.

17 Claims, 8 Drawing Sheets

(51) Int. Cl.
   *G01N 1/14* (2006.01)
   *G01N 1/24* (2006.01)
   *G01N 1/20* (2006.01)

(52) U.S. Cl.
   CPC ............. *G01N 1/2205* (2013.01); *G01N 1/24* (2013.01); *G01N 2001/2223* (2013.01)

(58) Field of Classification Search
   USPC ...................................................... 73/863.23
   See application file for complete search history.

(56) References Cited

U.S. PATENT DOCUMENTS

| | | | | |
|---|---|---|---|---|
| 4,552,178 A * | 11/1985 | Olsson | ..................... | F16J 15/40 137/269 |
| 4,625,569 A * | 12/1986 | Toei | ................... | G01N 35/1097 73/863.72 |
| 5,105,851 A * | 4/1992 | Fogelman | ............. | F16K 11/083 137/625.11 |
| 5,803,117 A * | 9/1998 | Olsen | ................. | F16K 11/0743 137/625.11 |
| 6,012,487 A * | 1/2000 | Hauck | ................. | F16K 11/0743 137/625.11 |
| 6,502,448 B1 * | 1/2003 | Rapkin | ................. | G01N 30/62 210/198.2 |
| 6,672,336 B2 * | 1/2004 | Nichols | ................. | F16K 11/074 137/625.11 |
| 8,047,060 B2 * | 11/2011 | Dourdeville | ........... | G01N 30/22 73/61.56 |
| 8,322,197 B2 * | 12/2012 | Koster | ................... | G01N 30/20 73/61.55 |
| 8,944,102 B1 * | 2/2015 | Wiederin | ............... | F16K 11/0743 137/625.46 |
| 9,146,182 B1 * | 9/2015 | Wiederin | ............... | G01N 30/20 |
| 9,541,207 B1 * | 1/2017 | Saetveit | ............. | F16K 11/0853 |
| 9,752,691 B1 * | 9/2017 | Saetveit | ................. | G01N 30/20 |
| 10,024,801 B2 * | 7/2018 | Kawabata | ............. | G01N 21/85 |
| 10,487,954 B2 * | 11/2019 | Killip | ..................... | G01N 30/38 |
| 10,746,708 B2 * | 8/2020 | Olovsson | ............... | G01N 30/20 |
| 2002/0146350 A1 | 10/2002 | Lo et al. | | |
| 2013/0276520 A1 * | 10/2013 | Moeller | ............. | F16K 11/0743 73/61.56 |
| 2014/0007600 A1 * | 1/2014 | Johnson | ................ | F28F 9/0246 62/89 |
| 2015/0047730 A1 * | 2/2015 | Dourdeville | ........ | F16K 11/0853 137/625.47 |

FOREIGN PATENT DOCUMENTS

| | | | | |
|---|---|---|---|---|
| KR | 1019980039942 | * | 6/1999 | ............ H01J 37/252 |
| KR | 1020120000538 | * | 6/2011 | ............ G01N 30/20 |
| KR | 101120944 B1 | | 3/2012 | |

* cited by examiner

PRECONCENTRATION OF FLUID SAMPLES WITH ALTERNATING DUAL LOOP INTRODUCTION

CROSS-REFERENCE TO RELATED APPLICATIONS

The present application claims the benefit of 35 U.S.C. § 119(e) of U.S. Provisional Application Ser. No. 62/717,340, filed Aug. 10, 2018, and titled "PRECONCENTRATION OF FLUID SAMPLES WITH ALTERNATING DUAL LOOP INTRODUCTION." U.S. Provisional Application Ser. No. 62/717,340 is herein incorporated by reference in its entirety.

BACKGROUND

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture.

Sample introduction systems may be employed to introduce liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for automatic preconcentration of fluid samples using alternating dual holding loops are described. A system embodiment includes, but is not limited to, a first sample loop and a second sample loop alternately fluidically coupled with a sample source; a first valve to alternately introduce fluid from the sample source to the first sample loop and the second sample loop; a second valve to alternately receive fluid from the first sample loop and the second sample loop and to alternately provide access to the preconcentration column to fluid received from the first sample loop and the second sample loop; and a pump system configured to alternately introduce sample held in the first sample loop and sample held in the second sample loop to the preconcentration column via the first valve and the second valve This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

DETAILED DESCRIPTION

Overview

Figure 1A:
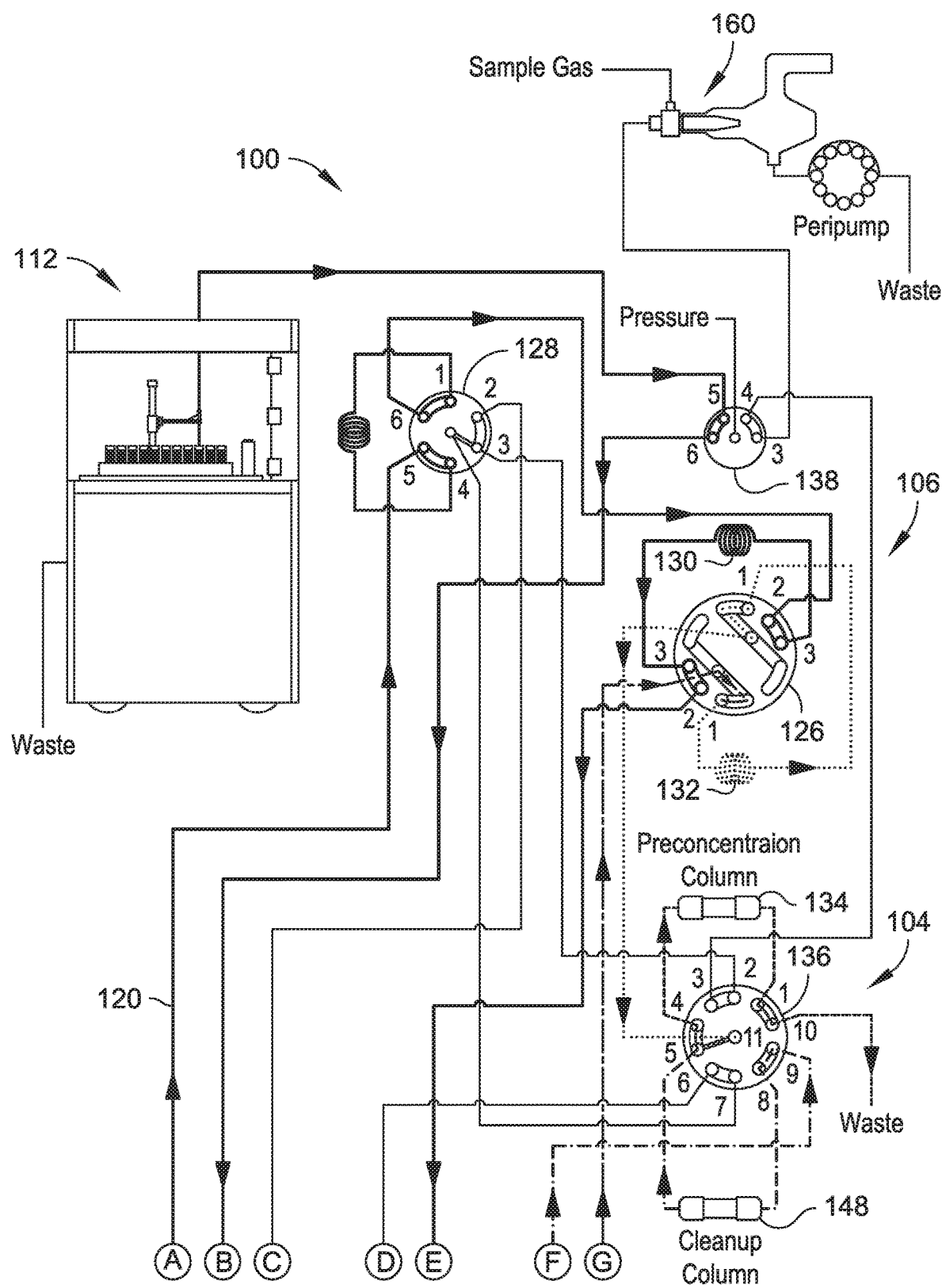
FIGS. 1A and 1B are a schematic illustration of a system for automatic preconcentration of fluid samples using alternating dual holding loops in accordance with example implementations of the present disclosure.

Determination of trace elemental concentrations or amounts in a sample can provide an indication of purity of the sample, or an acceptability of the sample for use as a reagent, reactive component, or the like. Some samples are present in high amounts of sample matrix relative to the analytes of interest, where such matrix can mask or inhibit sensing of particular analytes in the sample. For example, the presence of certain analytes in seawater can be masked or inhibited by the presence of other analytes in seawater, or can be particularly diluted by the volume of water. Separation columns can be utilized to preconcentrate an analyte or groups of analytes from a high matrix sample, where subsequent elution of the preconcentrated samples can provide a suitable concentration of analytes to be detected by an analysis system, such as ICP spectrometry instrumentation (e.g., an Inductively Coupled Plasma Mass Spectrometer (ICP/ICP-MS), an Inductively Coupled Plasma Atomic Emission Spectrometer (ICP-AES), or the like). However, introducing large volumes of sample (e.g., samples of about one liter and higher) to a preconcentration column can require significant amounts of time, particularly where the volume of sample introduced to the preconcentration column should be precisely measured to determine trace elemental concentrations or amounts of analytes of interest in the sample. Inefficiencies in the transfer of fluid sample to the preconcentration column can add significant amounts of time to process a single sample, which can reduce the throughput of analysis of multiple samples in a given time period. Moreover, loss of precise control in the volume of sample delivered to the preconcentration column can negatively impact the accuracy or sensitivity of analysis of the sample following elution from the preconcentration column.

Accordingly, the present disclosure is directed, at least in part, to systems and methods for automatic preconcentration of fluid samples using alternating dual holding loops. Example systems employ pump and valve configurations to automatically transfer precise volumes of fluid samples introduced to a preconcentration column. The systems employ dual holding loops of specific volumes that are alternately cycled between loading and dispensing operations, with each loop having an alternate operation with respect to the other loop, such that one loop is loaded by the system while the other loop is introduced to the column for preconcentration, with the cycles repeating until a desired cumulative volume of sample is introduced to the preconcentration column. The systems employ syringe pumps for controlled distribution of fluids, where each loop has dedicated syringes that are refilled during alternating cycles of operation to provide a substantially continuous introduction of sample to the preconcentration column.

Example Implementations

FIGS. 1A through 3B illustrate a system 100 for automatic preconcentration of fluid samples using alternating dual holding loops in an example implementation. As shown, the system 100 generally includes a sample input portion 102, a sample preconcentration portion 104, a sample holding portion 106, and a pump system 108. The sample input portion 102 facilitates introduction of a fluid sample to the system 100 for preconcentration and transfer to an analysis system for determination of elemental concentrations or amounts of analytes of interest. In an example implementation, the sample input portion 102 includes a valve 110 in fluid communication with an autosampler 112, one or more sample reservoirs 114, and a water supply input 116 to selectably couple one of the autosampler 112, one or more sample reservoirs 114, or the water supply input 116 with the sample preconcentration portion 104. For example, the valve 110 can include a channel 118 to couple a selected sample source to the sample preconcentration portion 104 (e.g., via coupling a port of the respective water or sample supply to a fluid line 120 to supply water to the sample preconcentration portion 104). The sample can be drawn from the respective sample sources through action of a sample pump 122 of the pump system 108 in fluid communication with the valve 110. For example, the sample pump 122 can be a syringe pump coupled to the valve 110 through fluid communication with a valve 124 and in fluid communication with a valve 126 of the sample holding portion 106 in fluid communication with a valve 128 in fluid communication with the valve 110. The valve 126 is switchable between differing flow path configurations to select which of a first sample loop 130 or a second sample loop 132 a sample received from the sample input portion 102 is to be directed. For example, the valve 126 can be positioned in a first flow path configuration to direct sample into the first sample loop 130 (e.g., as described with reference to FIGS. 1A and 1B) and can be positioned in a second flow path configuration to direct sample into the second sample loop 132 (e.g., as described with reference to FIGS. 3A and 3B). While the sample loops are shown as coiled sections of tubing, the first sample loop 130 and the second sample loop 132 are not limited to coiled configurations and can include other configurations including, but not limited to, serpentine configurations, linear configurations, combinations thereof, or the like, having preset or known interior volumes to hold sample therein.

Samples held in the first sample loop 130 and the second sample loop 132 are directed to a preconcentration column 134 of the sample preconcentration portion 104 through fluid communication between the valve 126 and a valve 136. As sample from one of the first sample loop 130 or the second sample loop 132 is dispensed from the loop to the preconcentration column 134, the other of the first sample loop 130 or the second sample loop 132 is loaded with sample from the sample input portion 102 to provide substantially continuous introduction of sample to the preconcentration column 134. The system 100 alternates between filling/dispensing cycles of the first sample loop 130 or the second sample loop 132 until a desired cumulative sample volume is directed through the preconcentration column 134. In implementations, the first sample loop 130 and the second sample loop 132 have substantially the same volume to maintain substantially similar timing of filling/dispensing cycles for each of the loops. For example, the total cumulative sample volume can include sample sizes of one liter and above, where for an example sample loop volume of 10 mL, can include fifty cycles of filling and dispensing for each of the first sample loop 130 and the second sample loop 132 to obtain a cumulative sample size of one liter provided to the preconcentration column 134.

Figure 1B:
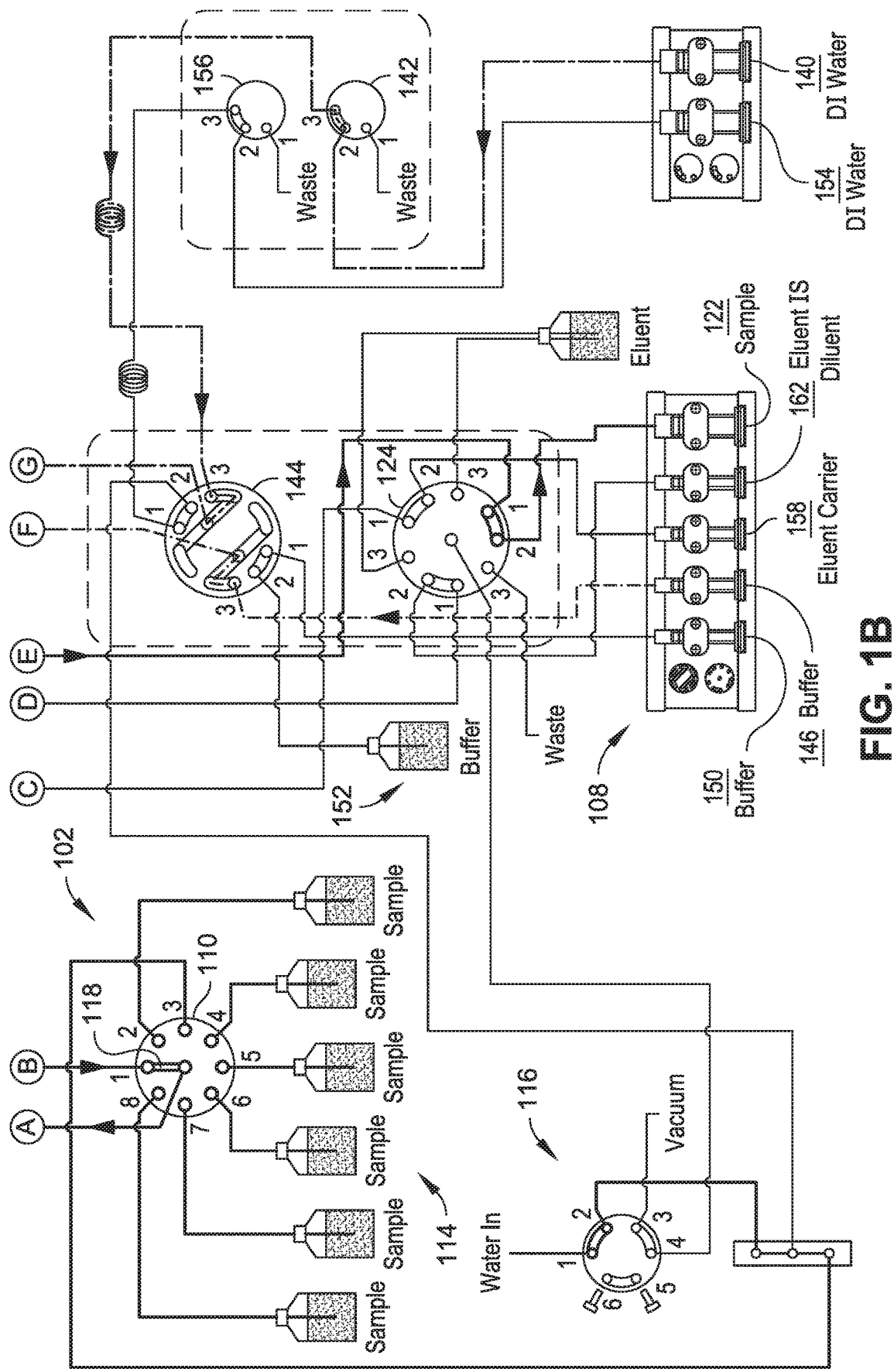
Figure 2A:
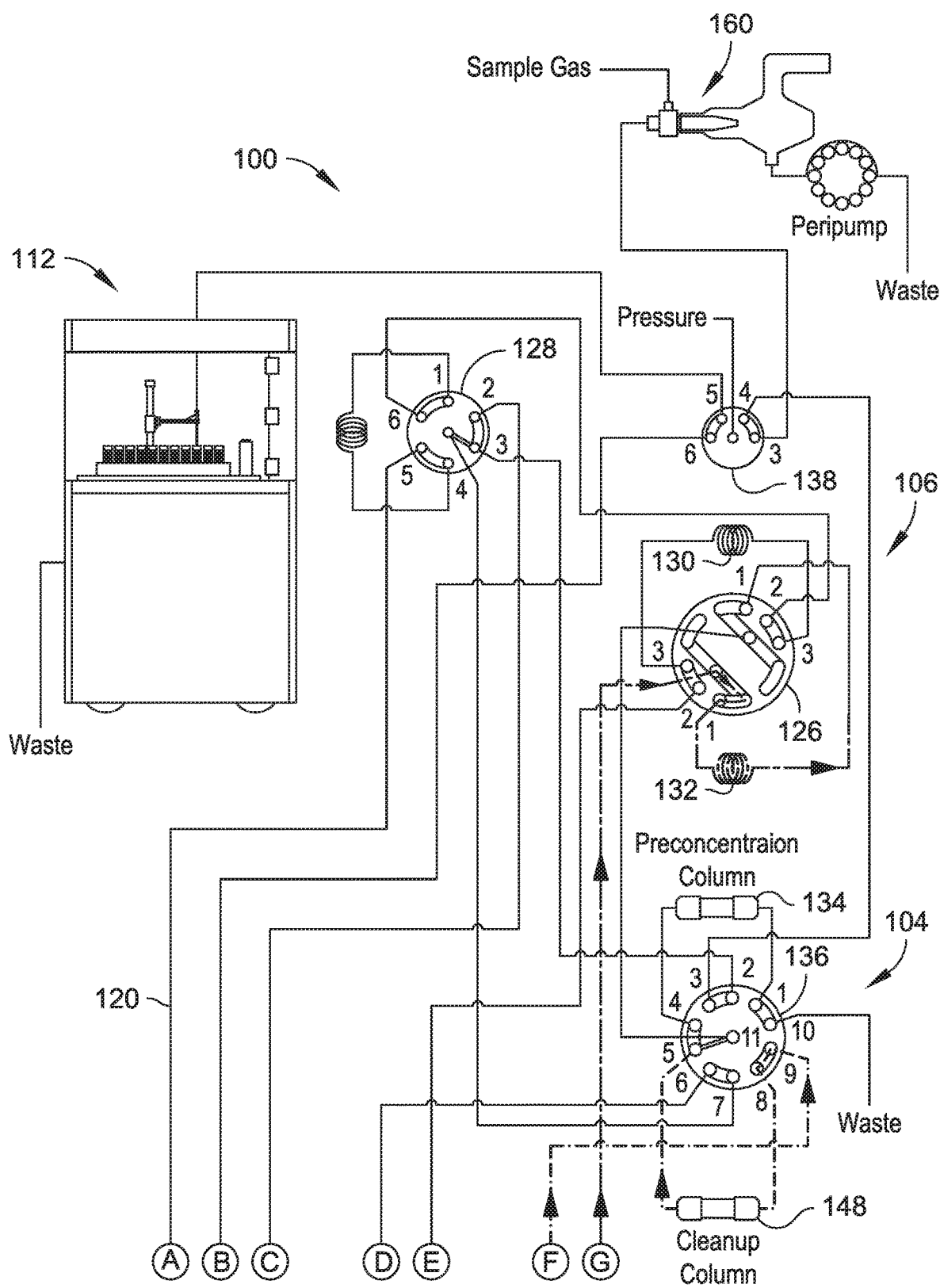
FIGS. 2A and 2B are a schematic illustration of the system for automatic preconcentration of fluid samples of FIGS. 1A and 1B during refill of syringes associated with sample, deionized water, and buffer delivery for a first holding loop.
Figure 2B:
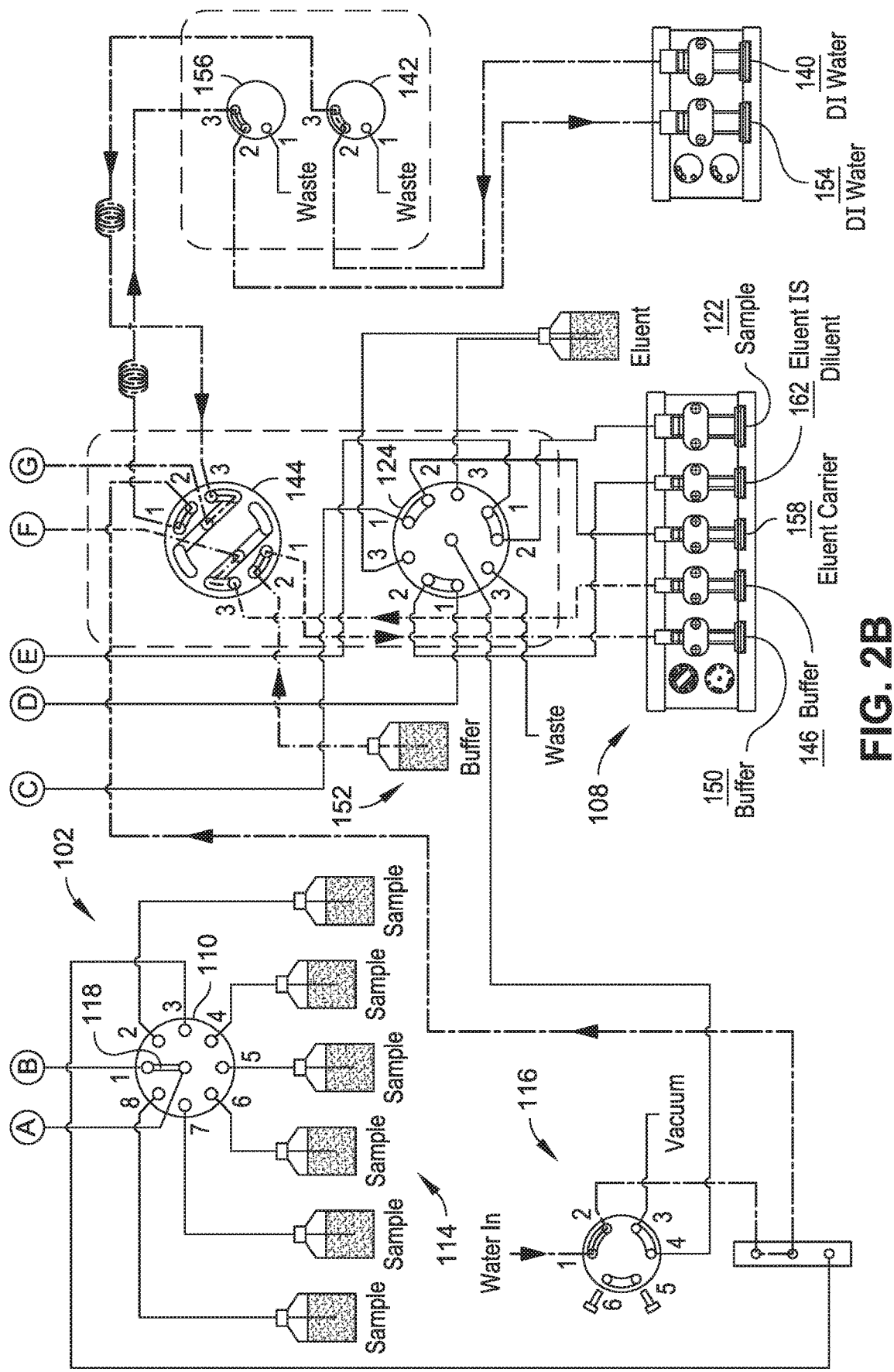
Figure 3A:
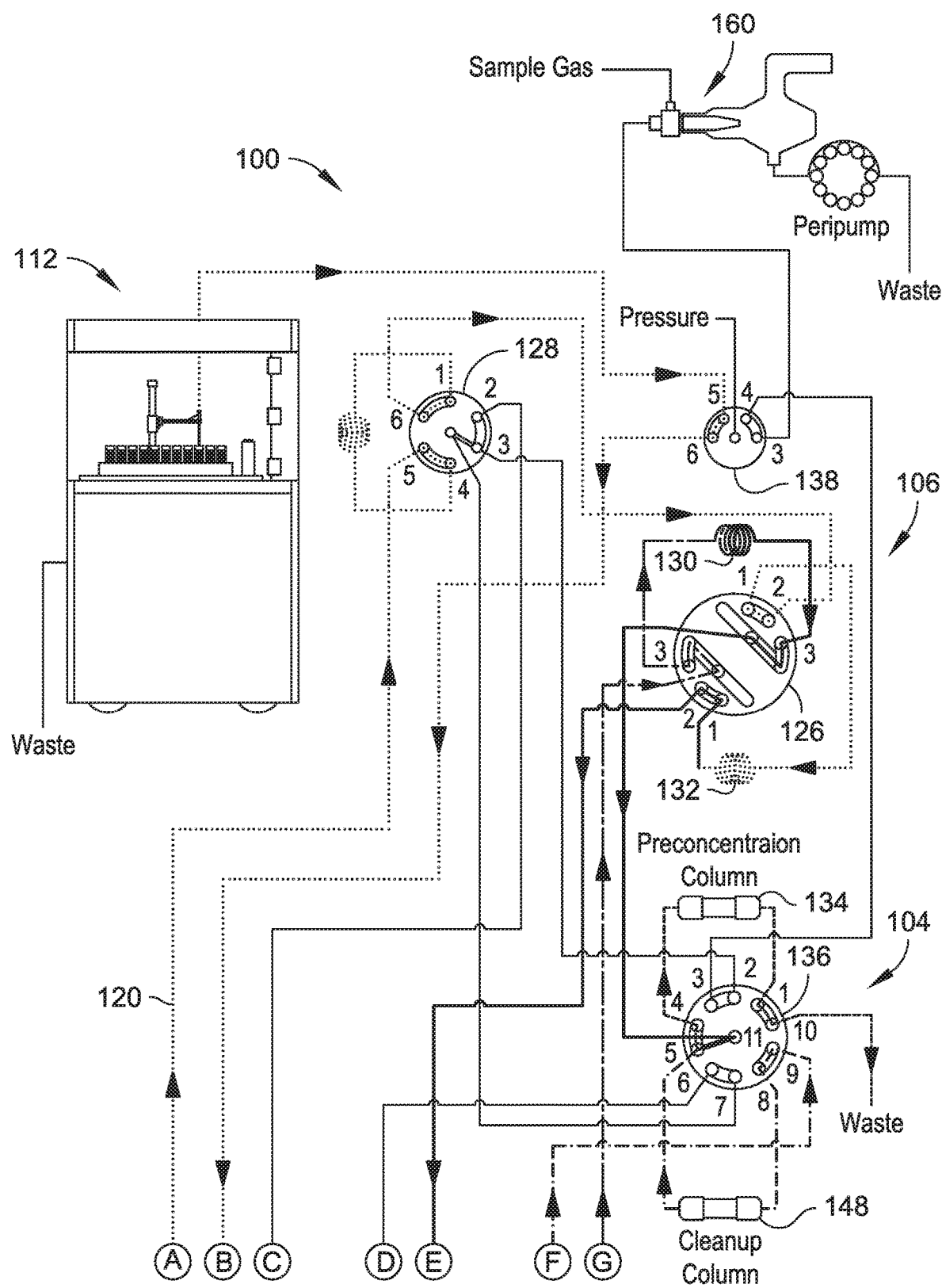
FIGS. 3A and 3B are a schematic illustration of the system for automatic preconcentration of fluid samples of FIGS. 1A and 1B in a load second loop configuration.
Figure 3B:
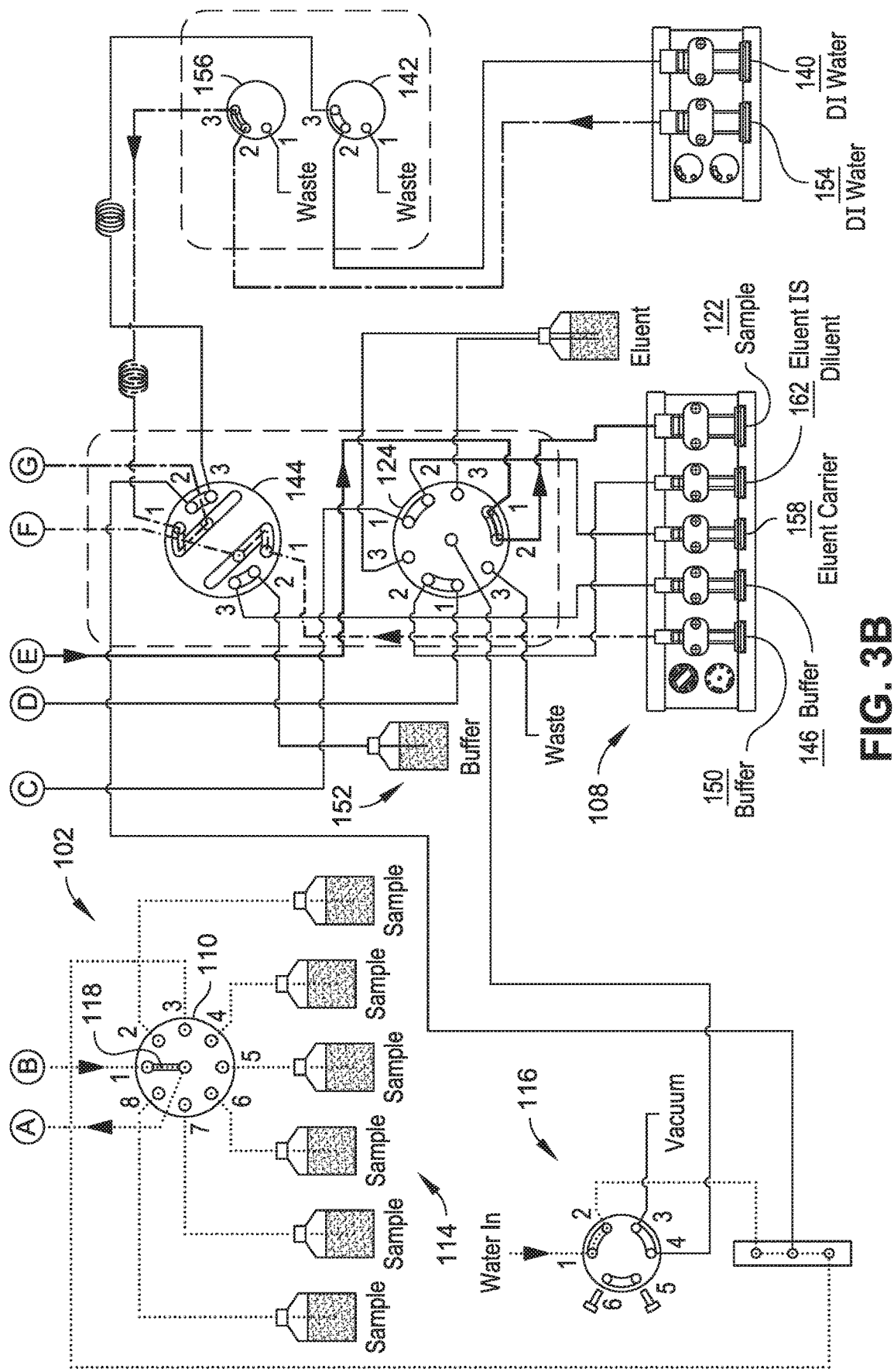

An example loading operation of the first sample loop 130 is shown in FIGS. 1A and 1B. As shown, the sample source for the sample input portion 102 is the autosampler 112 through connection of ports of the valve 102 via the channel 118 to connect the autosampler 112 (via a valve 138) to the valve 128 and to the valve 126, which in turn directs the sample to the first sample loop 130 through operation of the sample pump 122. During the loading operation of the first sample loop 130, sample held in the second sample loop 132 (e.g., previously loaded) is dispensed from the second sample loop 132 and loaded on the preconcentration column 134. For example, a syringe pump 140 of the pump system 108 can push a fluid (e.g., water, carrier fluid, etc.) against the sample held in the second sample loop 132 through fluid communication with a valve 142 in fluid communication with a valve 144 which is in fluid communication with each of the valve 126 and the valve 136. Since the volume of the sample held in the second sample loop 132 is established by the size of the second sample loop 132, the pumping rate of the sample pump 122 can establish how long the sample pump 122 should operate to dispense the precise volume of sample held in the second sample loop 132.

As the sample is pushed from the second sample loop 132, the sample is directed to the valve 136, where a buffer can be mixed with the sample at a mixing port of the valve 136 (e.g., port 5 of valve 136) which combines the flows of the sample and the buffer. For example, the buffer can be supplied to the valve 136 through operation of a buffer pump 146 of the pump system 108 which pushes buffer through the valve 144 in fluid communication with the valve 136, through a cleanup column 148 and into the mixing port of the valve 136 to mix with the sample from the second sample loop 132. The cleanup column 148 can include resins or other materials to remove trace metals or other impurities from the buffer before contacting the buffer with the sample. The mixed sample and buffer is then directed through the preconcentration column 134 through action of the buffer pump 146 and the syringe pump 140.

After the sample has been loaded onto the first sample loop 130, syringe pumps used to introduce sample from the first sample loop 130 to the preconcentration column 134 and to load sample onto the second sample loop 132 in the successive operation cycle can be reset or refilled with fluid in preparation of the next dispensing of the sample from the first sample loop 130. For example, with reference to FIGS. 2A and 2B, the sample pump 122 can be reset (e.g., the plunger position reset) in preparation for the sample pump 122 to draw the next sample from the sample input portion 102 to load onto the second sample loop 132 after the second sample loop 132 is emptied of sample. Further, a buffer pump 150 of the pump system 108 can be refilled with buffer fluid through fluid communication between the valve 144 and a source of buffer fluid 152 while a syringe pump 154 of the pump system 108 refills with fluid (e.g., water, carrier fluid, etc.), where the buffer pump 150 and the syringe pump 154 can push the respective fluids to direct the sample held in the first sample loop 130 to the preconcentration column 134 during the next operation cycle. In implementations, the reset/refilling of the sample pump 122, the buffer pump 150, and the syringe pump 154 occurs substantially simultaneously with dispensing the sample held in the second sample loop 132 to the preconcentration column 134 (also shown in FIGS. 1A and 1B). For example, the syringe pump 140 can continue to operate to push the sample from the second sample loop 132 and the buffer pump 146 can continue to supply buffer to the valve 136 to mix with the sample from the second sample loop 132 during the reset of the sample pump 122, the buffer pump 150, or other pump(s).

Following loading of sample into the first sample loop 130 and dispensing of the sample from the second sample loop 132, the system 100 can alternate operation cycles to dispense sample from the first sample loop 130 to the preconcentration column 134 and load sample into the second sample loop 132. For example, with reference to FIGS. 3A and 3B, a sample is transferred from the sample input port 102 to the valve 126 through operation of the sample pump 122. The valve 126 switches flow path configuration as compared to the flow path configuration used to load the first sample loop 130 to direct the sample into the second sample loop 132. During the loading operation of the second sample loop 132, sample held in the first sample loop 130 (loaded in the previous operation cycle, as described with reference to FIGS. 1A and 1B) is dispensed from first sample loop 130 and loaded on the preconcentration column 134. For example, the syringe pump 154 can push the fluid loaded during the previous cycle (e.g., water, carrier fluid, etc.) against the sample held in the first sample loop 130 through fluid communication with a valve 156 in fluid communication with the valve 144 which is in fluid communication with each of the valve 126 and the valve 136. The valve 144 switches flow path configuration as compared to the flow path configuration used to introduce buffer to the valve 136 during dispensing of the sample from the second sample loop 132 (e.g., as described with reference to FIGS. 1A and 1B). Since the volume of the sample held in the first sample loop 130 is established by the size of the first sample loop 130, the pumping rate of the sample pump 122 can establish how long the sample pump 122 should operate to dispense the precise volume of sample held in the first sample loop 130.

As the sample is pushed from the first sample loop 130, the sample is directed to the valve 136, where a buffer can be mixed with the sample at a mixing port of the valve 136 which combines the flows of the sample and the buffer. For example, the buffer can be supplied to the valve 136 through operation of the buffer pump 150 which pushes buffer loaded in the previous operation cycle (e.g., described with reference to FIGS. 2A and 2B) through the valve 144 in fluid communication with the valve 136, through the cleanup column 148 and into the mixing port of the valve 136 to mix with the sample from the first sample loop 130. The mixed sample and buffer is then directed through the preconcentration column 134 through action of the buffer pump 150 and the syringe pump 154.

After the sample has been loaded onto the second sample loop 132, syringe pumps used to introduce sample from the second sample loop 132 to the preconcentration column 134 and to load the first sample loop 130 in the successive operation cycle can be reset or refilled with fluid in preparation of the next dispensing of the sample from the second sample loop 132. For example, the sample pump 122 can be reset (e.g., the plunger position reset) to permit the sample pump 122 to draw the next sample from the sample input portion 102 to fill the first sample loop 130. Further, the buffer pump 146 can be refilled with buffer fluid through fluid communication between the valve 144 and the source of buffer fluid 152 while the syringe pump 140 refills with fluid (e.g., water, carrier fluid, etc.), where the buffer pump 146 and the syringe pump 140 can push the respective fluids to direct the sample held in the second sample loop 132 to the preconcentration column 134 during the next operation cycle. In implementations, the reset/refilling of the sample pump 122, the buffer pump 146, and the syringe pump 140 occurs substantially simultaneously with dispensing the sample held in the first sample loop 130 to the preconcentration column 134. For example, the syringe pump 154 can continue to operate to push the sample from the first sample loop 130 and the buffer pump 150 can continue to supply buffer to the valve 136 to mix with the sample from the first sample loop 130 during the reset of the sample pump 122, the buffer pump 146, or other pump(s).

When the desired cumulative volume of sample has passed through the preconcentration column 134), an eluent can be introduced to the preconcentration column 134 through operation of an eluent pump 158 of the pump system 108 to carry analytes of interest retained by the preconcentration column 134 to an analysis system, such as through fluid communication between the valve 136, the valve 128, and a nebulizer 160 coupled with an analysis system (e.g., ICP spectrometry instrumentation (e.g., an Inductively Coupled Plasma Mass Spectrometer (ICP/ICP-MS), an Inductively Coupled Plasma Atomic Emission Spectrometer (ICP-AES), or the like). An internal standard or other chemical can be added to the sample before, during, or after elution through operation of a syringe pump 162 of the pump system 108. In implementations, a computer or system controller can track the number of cycles of operation of the pump 122 to determine the volume of sample dispensed from the first sample loop 130 and the second sample loop 132 to track the cumulative volume of sample passed to the preconcentration column 134. The computer or system controller can then initiate operation of the eluent pump 158 to remove analytes of interest from the preconcentration column 134 for analysis.

Figure 4A:
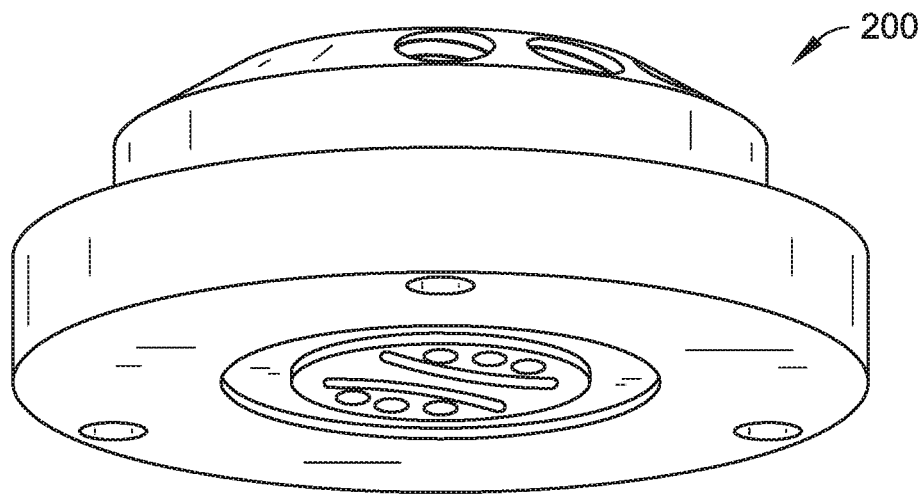
FIG. 4A is an illustration of a multi-port rotor for a valve of the system for automatic preconcentration of fluid samples in accordance with example implementations of the present disclosure.
Figure 4B:
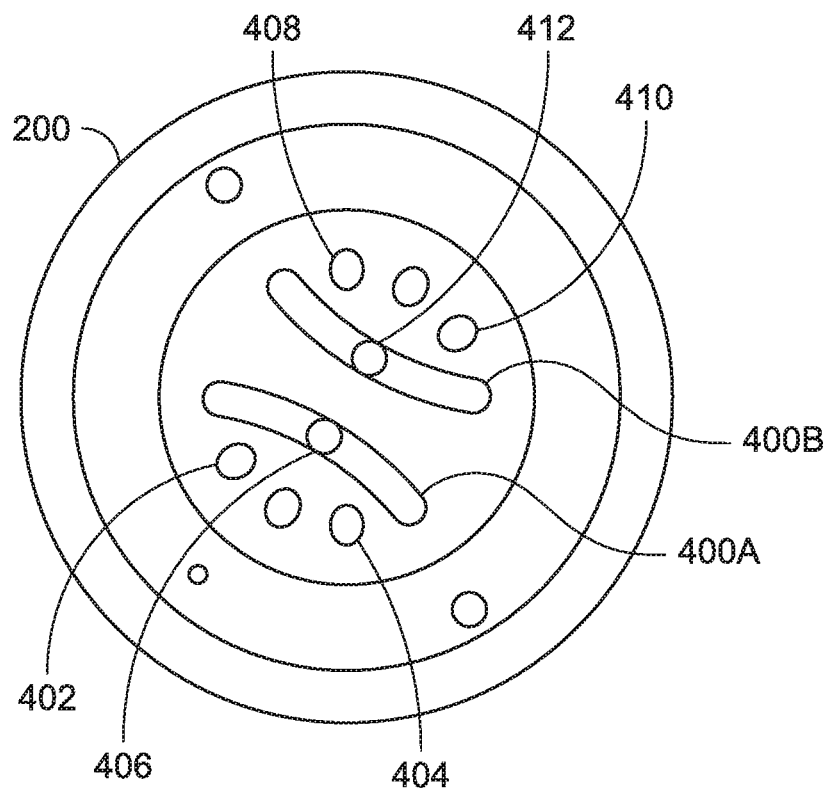
FIG. 4B is a bottom plan view of the multi-port rotor of FIG. 4A.
Figure 4C:
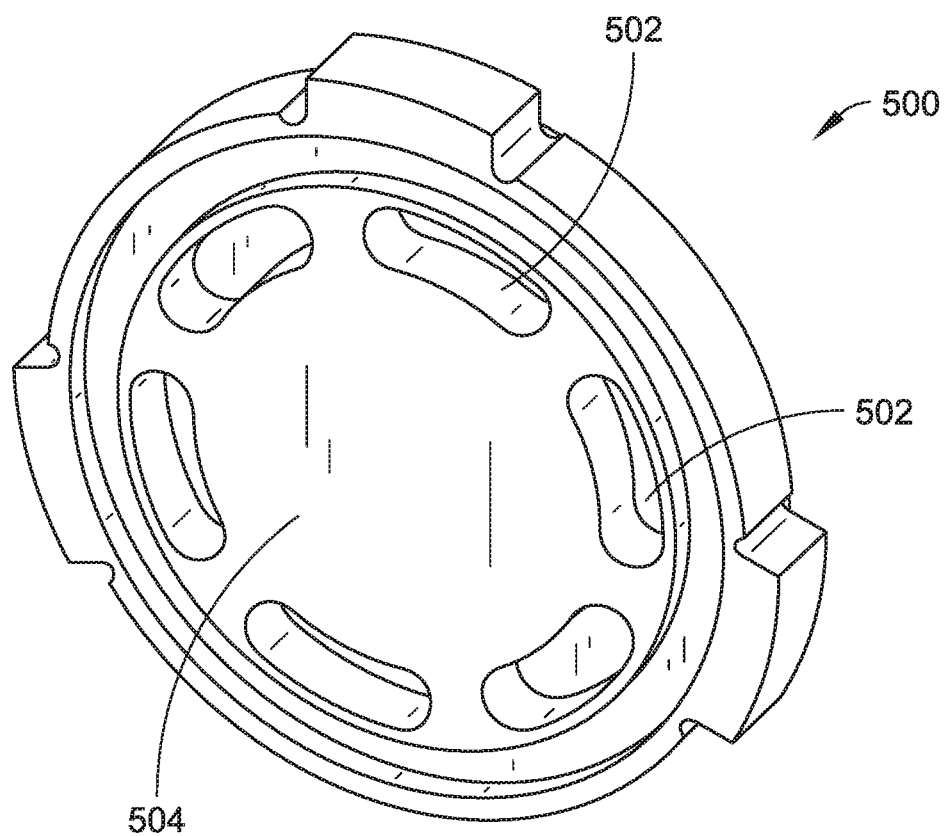
FIG. 4C is an illustration of a stator to mate with the multiport rotor of FIG. 4A in accordance with example implementations of the present disclosure.

Referring to FIGS. 4A-4C, an example implementation of the valves 126 and 144 is shown. For example, FIGS. 4A and 4B show an example rotor 200 of the valves 126 and 144, which includes a pair of channels (400A and 400B are shown). The channels can couple an adjacent port to a port disposed on the channel when a channel of a stator 500 (e.g., as shown in FIG. 4C) connects the channel 400A or 400B and the adjacent port. For example, ports 402 and 404 can alternately fluidically couple with channel 400A and with port 406 on the channel 400A based on the positioning of the channels 502 of the stator 500 as the rotor 200 rotates relative to the stator 500. Similarly, ports 408 and 410 can alternately fluidically couple with channel 400B and with port 412 on the channel 400B based on the positioning of the channels 502 of the stator 500 as the rotor 200 rotates relative to the stator 500. The ports 406 and 412 pass through the rotor 200 and through the channels 400A and 400B, respectively, and can couple with a fluid line supported by the rotor to fluidically connect the valves 126 and 144 with each other and with the valve 136 of the sample preconcentration portion 104. In implementations, the channel 400A is a curved channel partially inset within the body of the rotor 412 to transfer fluid within the channel (e.g., along a surface 504 of the stator 500) from one of the ports 402 or 404, through the channel 502, and along the channel 400A to the port 406, whereas the channel 400B is a curved channel partially inset within the body of the rotor 412 to transfer fluid within the channel (e.g., along the surface 504 of the stator 500) from one of the ports 408 or 410, through the channel 502, and along the channel 400B to the port 412. The positioning of the channels 502 of the stator 500 relative to the ports of the rotor 200 dictates which flow path configuration is adopted by the valves 126 and 144 (e.g., a first flow path configuration shown in FIGS. 1A through 2B, and a second flow path configuration shown in FIGS. 3A and 3B). Additional or fewer ports or channels 502 can be utilized to provide differing valve configurations.

The system 100 can automatically manage sample loading, dispensing, and preconcentration through automatic operation of valves, pumps, mass flow controllers, or other components of the system 100. For example, the system 100 can include a computing device including a processor and a memory. The processor provides processing functionality for the computing device and may include any number of processors, micro-controllers, or other processing systems, and resident or external memory for storing data and other information accessed or generated by the computing device. The processor may execute one or more software programs that implement the techniques and flow path configurations described herein. The processor is not limited by the materials from which it is formed or the processing mechanisms employed therein and, as such, may be implemented via semiconductor(s) and/or transistors (e.g., electronic integrated circuits (ICs)), and so forth.

The memory is an example of device-readable storage media that provides storage functionality to store various data associated with the operation of the computing device, such as the software program and code segments mentioned above, or other data to instruct the processor and other elements of the computing device to perform the techniques described herein. Although a single memory is mentioned above, a wide variety of types and combinations of memory may be employed. The memory may be integral with the processor, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device includes a display to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing device may also include a communication module representative of communication functionality to permit computing device to send/receive data between different devices (e.g., components/peripherals) and/or over one or more networks. The communication module may be representative of a variety of communication components and functionality including, but not necessarily limited to: a browser; a transmitter and/or receiver; data ports; software interfaces and drivers; networking interfaces; data processing components; and so forth. The one or more networks are representative of a variety of different communication pathways and network connections which may be employed, individually or in combinations, to communicate among the components of the automatic sample preconcentration environment. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device is described as including a user interface to allow the user to interact with one or more applications of the computing device by providing inputs (e.g., sample identities, sample source, fluid flow rates, desired cumulative sample volume, syringe pump timing, valve timing, eluent identities, buffer identifies, etc.) via the touch screen and/or the I/O devices to permit the controller to control the timing of valves and pumps to support the valve configurations to provide fluid flow paths as described with reference to FIGS. 1A through 3B.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A sample preconcentration system comprising:
   a first sample loop and a second sample loop alternately fluidically coupled with a sample source;
   a first valve fluidically coupled with the first sample loop and the second sample loop and configured to alternately introduce fluid from the sample source to the first sample loop and the second sample loop;
   a second valve fluidically coupled with the first valve to alternately receive fluid from the first sample loop and the second sample loop, the second valve configured to be fluidically coupled with a preconcentration column and to alternately provide access to the preconcentration column to fluid received from the first sample loop and the second sample loop; and
   a pump system configured to alternately introduce sample held in the first sample loop and sample held in the second sample loop to the preconcentration column via the first valve and the second valve and to alternately introduce sample from the sample source into the first sample loop and the second sample loop, wherein the pump system includes a first pump fluidically coupled with the sample source, the first pump configured to draw sample fluid from the sample source and through the first sample loop and the second sample loop during alternate operation cycles.

2. The sample preconcentration system of claim 1, wherein the pump system includes a second pump fluidically coupled with the first sample loop, the second pump configured to transfer sample fluid from the first sample loop during operation of the first pump to draw sample fluid from the sample source and through the second sample loop.

3. The sample preconcentration system of claim 2, wherein the pump system includes a third pump fluidically coupled with the second sample loop, the third pump configured to transfer sample fluid from the second sample loop during operation of the first pump to draw sample fluid from the sample source and through the first sample loop.

4. The sample preconcentration system of claim 3, wherein the second pump is configured to refill with fluid during operation of the third pump in preparation of a subsequent transfer of sample from the first sample loop through pushing with the fluid.

5. The sample preconcentration system of claim 1, wherein the first valve includes:
   a rotor defining a first channel having a first port extending through the rotor within the first channel and defining a plurality of ports displaced from the first channel; and
   a stator defining a second channel to fluidically couple the first port within the first channel with a first port of the plurality of ports in a first configuration of the first valve and to fluidically couple the first port within the first channel with a second port of the plurality of ports in a second configuration of the first valve.

6. The sample preconcentration system of claim 5, wherein the first port within the first channel is fluidically coupled with the second valve.

7. The sample preconcentration system of claim 1, wherein the sample source includes a third valve configured to selectively couple with one of a plurality of fluid sample sources to fluidically couple the selected fluid sample source with the first valve.

8. The sample preconcentration system of claim 7, wherein the third valve includes a channel configured to rotate to fluidically couple the first valve with the selected fluid sample source.

9. The sample preconcentration system of claim 1, wherein the pump system is configured to introduce a buffer to the sample for mixing prior to introduction to the preconcentration column.

10. The sample preconcentration system of claim 1, wherein the first sample loop and the second sample loop have substantially the same volume.

11. A method for preconcentrating a sample, comprising:
    introducing a first fluid sample from a sample source to a first sample loop of a sample preconcentration system through operation of a first pump;
    transferring a second fluid sample held in a second sample loop from the second sample loop to a preconcentration column configured to retain one or more analytes of interest from the second fluid sample;
    subsequent to transferring the second fluid sample from the second sample loop to the preconcentration column, transferring the first fluid sample from the first sample loop to the preconcentration column; and
    introducing a third fluid sample from the sample source to the second sample loop through operation of the first pump during transfer of the first fluid sample from the first sample loop to the preconcentration column.

12. The method of claim 11, further comprising:
    subsequent to transferring the first fluid sample from the first sample loop to the preconcentration column, transferring the third fluid sample from the second sample loop to the preconcentration column.

13. The method of claim 12, further comprising:
    introducing a fourth fluid sample from the sample source to the first sample loop during transfer of the third fluid sample from second sample loop to the preconcentration column.

14. The method of claim 11, wherein the first fluid sample and the second fluid sample originate from a same sample source.

15. The method of claim 11, further comprising:
    mixing a buffer fluid with the second sample fluid during transfer of the second sample fluid from the second sample loop prior to introduction to the preconcentration column.

16. The method of claim 11, wherein transferring a second fluid sample held in a second sample loop from the second sample loop to a preconcentration column includes transferring the second fluid sample held in the second sample loop from the second sample loop to the preconcentration column through operation of a second pump.

17. The method of claim 16, wherein transferring the first fluid sample from the first sample loop to the preconcentration column includes transferring the first fluid sample from the first sample loop to the preconcentration column through operation of a third pump.

* * * * *